(12) United States Patent
Corradini

(10) Patent No.: US 6,929,101 B1
(45) Date of Patent: Aug. 16, 2005

(54) HIDDEN BRAKE SYSTEM FOR A WHEEL

(76) Inventor: Damyon L. Corradini, 536 Mountain Shadow La., Bloomsburg, PA (US) 17815

( * ) Notice: Subject to any disclaimer, the term of this patent is extended or adjusted under 35 U.S.C. 154(b) by 36 days.

(21) Appl. No.: 10/709,150

(22) Filed: Apr. 16, 2004

(51) Int. Cl.$^7$ .............................................. F16D 55/00
(52) U.S. Cl. ............... 188/70 R; 188/71.1; 188/106 A; 188/106 R
(58) Field of Search .......................... 188/70 R, 70 B, 188/106 R, 106 A, 26, 71.1, 72.1, 72.4, 72.7

(56) References Cited

U.S. PATENT DOCUMENTS

| | | | |
|---|---|---|---|
| 2,109,722 A | * | 3/1938 | Fawick ....................... 188/72.2 |
| 3,268,035 A | * | 8/1966 | Wagner ....................... 188/72.3 |
| 3,952,841 A | | 4/1976 | Pringle |
| 3,982,610 A | * | 9/1976 | Campagnolo ............. 188/18 A |
| 5,570,760 A | * | 11/1996 | Lai .............................. 188/26 |
| 6,619,441 B2 | * | 9/2003 | Baldwin ................... 188/70 R |

* cited by examiner

Primary Examiner—Matthew C. Graham
(74) Attorney, Agent, or Firm—John J. Elnitski, Jr.

(57) ABSTRACT

A brake system for a wheel including a plunger assembly, brake pad assembly, drum assembly and a spring. The plunger assembly includes a plunger movable in a plunger housing, brake pad assembly chamber in the plunger housing and an axle opening. The brake pad assembly is movably mounted in the brake pad assembly chamber, whereby movement of the plunger causes movement of the brake pad assembly in the brake pad assembly chamber. The brake pad assembly includes an axle opening. The spring biases the brake pad assembly into the brake pad assembly chamber. The drum assembly includes a drum housing and a drum wear unit in the drum housing. The drum assembly includes an axle opening.

23 Claims, 7 Drawing Sheets

HIDDEN BRAKE SYSTEM FOR A WHEEL

BACKGROUND OF INVENTION

The present invention generally relates to brake systems for vehicles. More specifically, the present invention relates to a brake system at a wheel that can be employed on a motorcycle, as well as on other vehicle types.

Motorcycles are becoming ever more popular, especially high end custom motorcycles intended for use on the highway. These custom motorcycles include many physical features for a custom stylized look. Almost all motorcycles utilize a disc brake system on the front wheel. The disc brake system includes a disc and a brake caliber. The disc is a thin round disc mounted to the wheel. The brake caliber is a big unit which is usually mounted to a front fork of the motorcycle. The brake caliber fits over the disc and includes two pads aligned on each side of the disc. The brake caliber is not aerodynamic. The brake caliber is not stylized. Custom motorcycles include an expensive custom stylized wheel and the brake caliber is consider an ugly feature which detracts from and covers the beauty of the custom wheel. Purchasers of custom motorcycles desire a brake system which is hidden in the custom stylized wheel and is not as obvious as the disc brake system to onlookers.

It is an object of the present invention to provide a hidden brake system for a motorcycle wheel which is not as obvious as the disc brake system to onlookers.

SUMMARY OF INVENTION

A brake system for a wheel including a plunger assembly, brake pad assembly, drum assembly and a spring. The plunger assembly includes a plunger movable in a plunger housing, brake pad assembly chamber in the plunger housing and an axle opening. The brake pad assembly is movably mounted in the brake pad assembly chamber, whereby movement of the plunger causes movement of the brake pad assembly in the brake pad assembly chamber. The brake pad assembly includes an axle opening. The spring biases the brake pad assembly into the brake pad assembly chamber. The drum assembly includes a drum housing and a drum wear unit in the drum housing. The drum assembly includes an axle opening.

DETAILED DESCRIPTION

Figure 1:
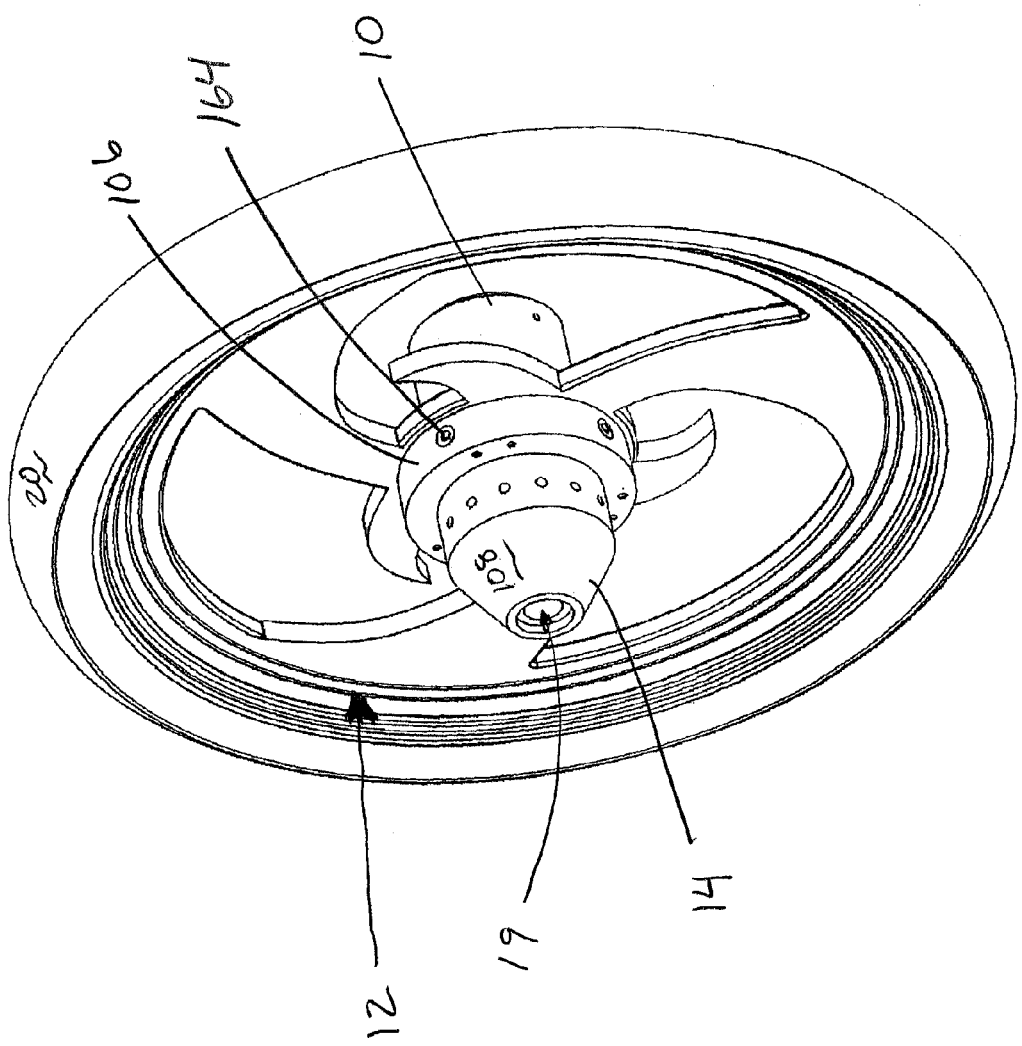
FIG. 1 is a perspective view of an assembled hidden brake system according to the present invention.
Figure 2:
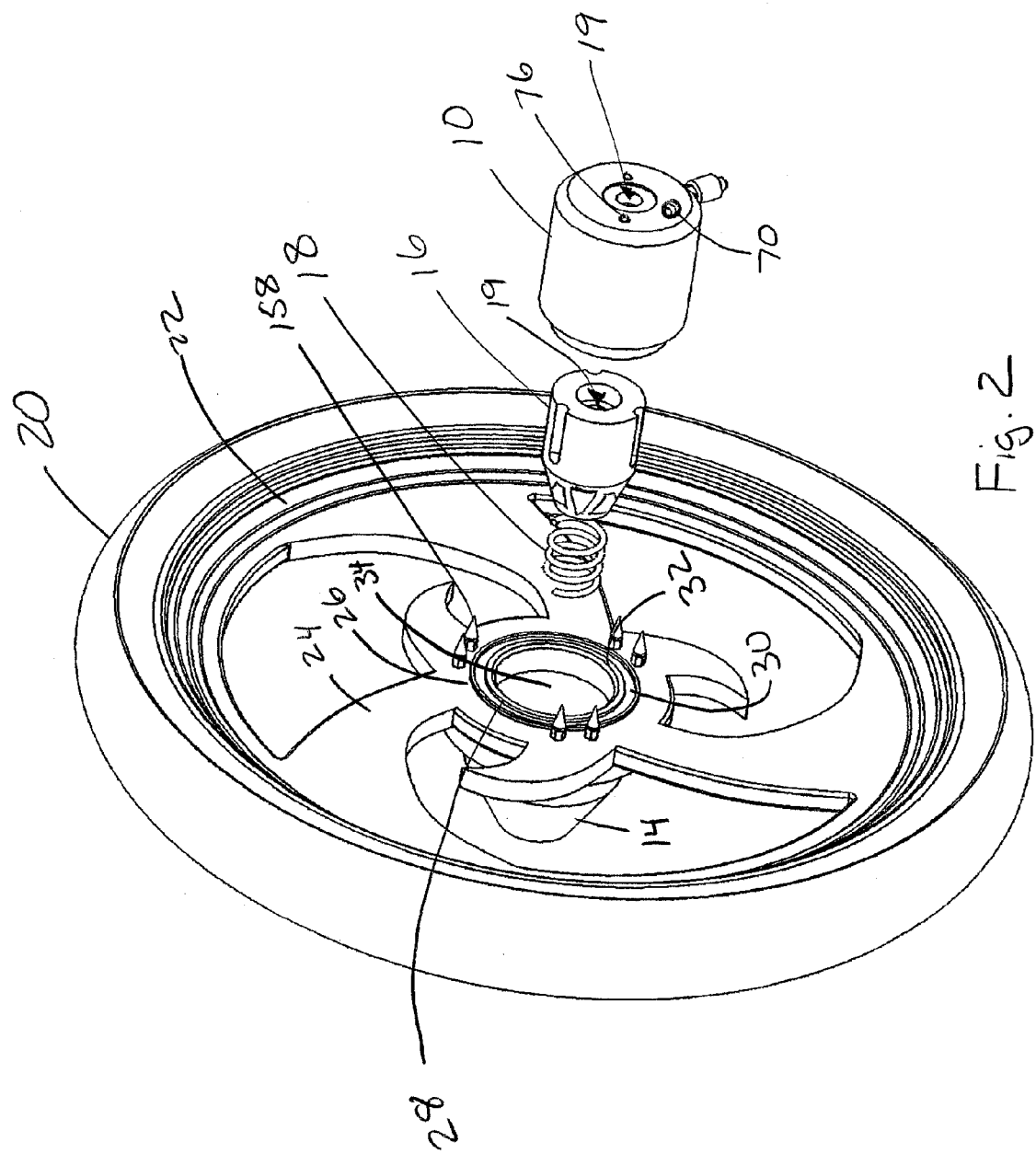
FIG. 2 is an exploded view of the hidden brake system according to the present invention.

The present invention is a hidden brake system for a wheel, as shown in FIGS. 1–7. The hidden brake system includes a plunger assembly 10 attached to one side of a wheel 12, a drum assembly 14 attached to the other side of the wheel 12, a brake pad assembly 16 and a spring 18, as shown in FIG. 2. The wheel 12 is shown with a tire 20. FIG. 2 shows the wheel 12 having a rim 22, spokes 24, hub 26 and a hub bearing 28. The rim 22 supports the tire 20. The spokes 24 extend out from the hub 26 to support the rim 24. Together the rim 22, spokes 24 and hub 26 form the wheel 12. The hub bearing 28 is shown as a high speed circumference bearing having an outer ring 30 and inner ring 32 separated by ball bearings. The hub bearing 28 is mounted in the hub 26 by press fitting the outer ring 30 into the center of the hub 26 from the plunger assembly side, whereby the inner ring 32 and the outer ring 30 rotate about each other. The inner ring 32 forms an open center 34 in the hub 26. Components of the plunger assembly 10, drum assembly 14, brake pad assembly 16 and spring 18 together form an axle opening 19 to allow an axle to pass through the hidden brake system for mounting of the wheel to a fork of a motorcycle.

Figure 3:
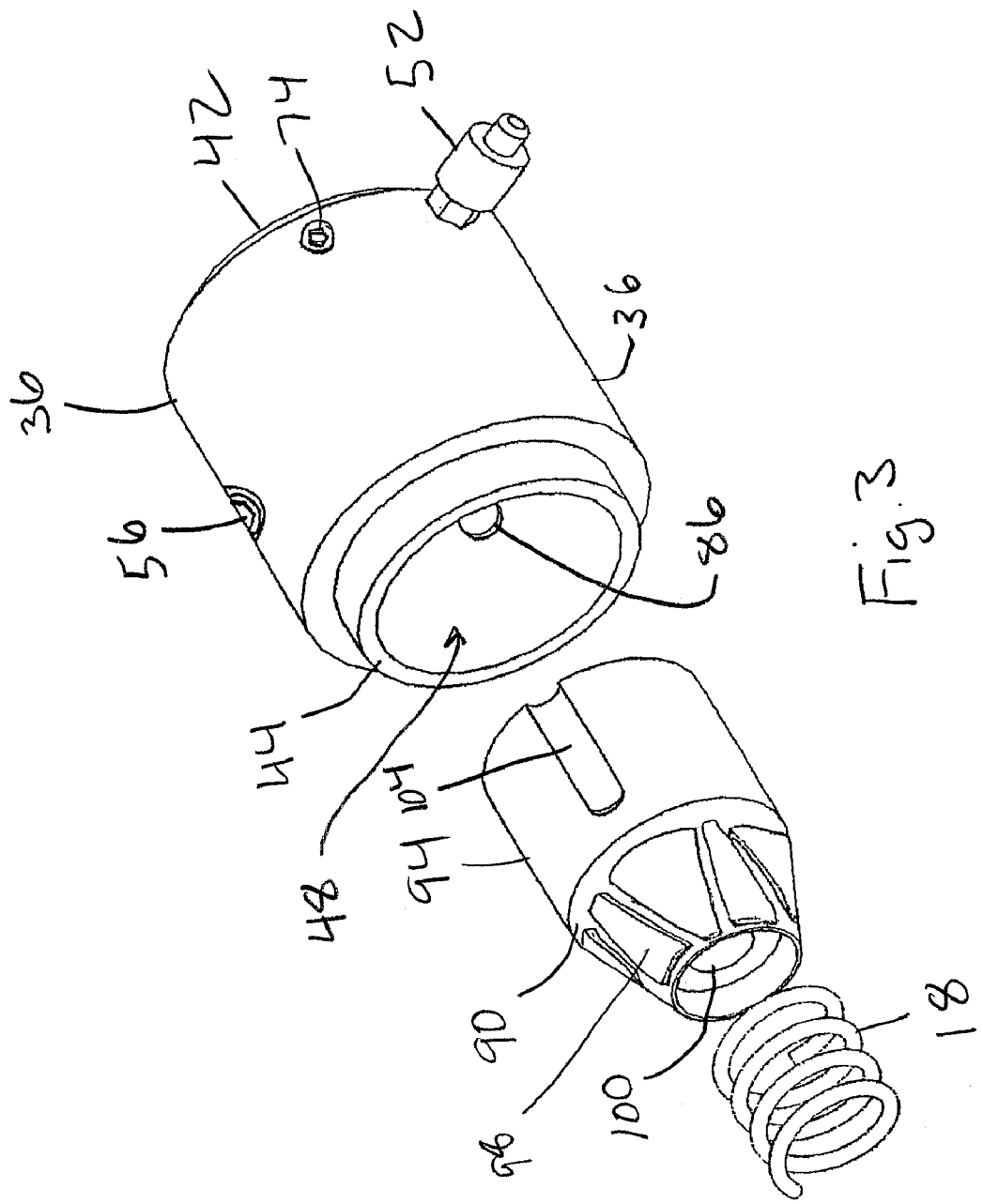
FIG. 3 is an exploded view of components of the hidden brake system according to the present invention.
Figure 4:
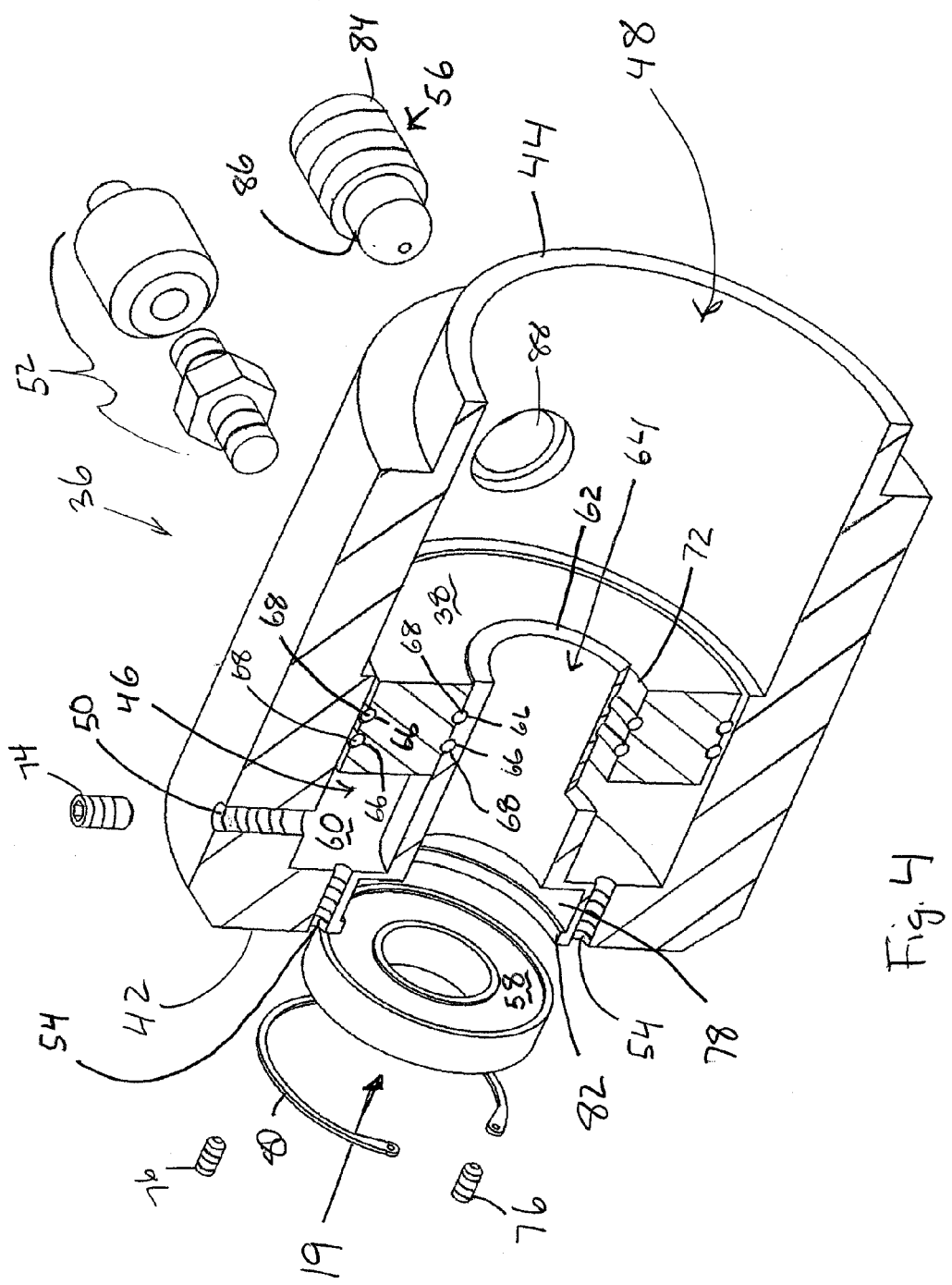
FIG. 4 is an exploded cross-sectional view of a plunger assembly according to the present invention.

FIGS. 2–4 show different views of the plunger assembly 10. The plunger assembly 10 includes a plunger housing 36 and a plunger 38. The plunger housing 36 is shown as a cylinder with the axle opening 19 in the center to allow an axle to pass through the plunger assembly 10. The plunger housing 36 includes an outside end 42 and an inside end 44. The outside end 42 of the plunger housing 36 faces towards a fork of the motorcycle and away from the hub 26. The inside end 44 is shown as a recessed lip which inserts into the open center 34 formed by the hub bearing 28. As shown in FIG. 4, the plunger housing 36 includes a hydraulic fluid chamber 46, brake pad assembly chamber 48, hydraulic fluid fill hole 50, hydraulic input connector 52, plunger removal holes 54, brake pad assembly guides 56 and a plunger housing axle bearing 58. The hydraulic fluid chamber 48 is a cylindrical chamber defined by an inner wall 60 of the plunger housing 36. The hydraulic fluid chamber 48 includes a post 62 with an open center 64. The open center 64 of the post 62 is part of the axle opening 19 to allow passage of an axle. The post 62 includes two grooves 66 to receive O-rings 68 to interact with the plunger 38. The plunger housing 36 also includes a fork attachment hole 70 on the outside end 42 of the plunger housing 36, which is threaded. The plunger 38 is puck shaped with an open center 72. The open center 72 of the plunger 38 allows the plunger 38 to be placed over the post 62 inside the plunger housing 36. The plunger 38 includes two grooves 66 on an outside surface to receive two O-rings 68 to interact with the inner wall 60 forming the hydraulic fluid chamber 48. The hydraulic fluid fill hole 50 is threaded to receive a set screw 74 to seal the hydraulic fluid fill hole 50. The hydraulic input connector 52 is threaded into the plunger housing 36 and includes a passage to access the hydraulic fluid chamber 48 to hydraulically connect the plunger assembly 10 to a brake input, which is not shown. The plunger removal holes 54 include set screws 76 to seal the plunger removal holes 54. The plunger housing axle bearing 58 mounts in a bearing cavity 78 in the outside end 42 of the plunger housing 36. The plunger housing axle bearing 58 is shown as a standard sealed high speed bearing. A snap ring 80 snaps into the bearing cavity 78 between the plunger housing axle bearing 58 and a lip 82 of the bearing cavity 78 to retain the plunger housing axle bearing 58 in the bearing cavity 78. The brake pad assembly guides 56 include a threaded body 84 and a head 86 extending from the threaded body 84. The brake pad assembly guides 56 thread into brake pad assembly guide holes 88 head first, so that the heads 86 of the brake pad assembly guides 56 extend into the brake pad assembly chamber 48. The heads 88 of the brake pad assembly guides 56 are ball shaped.

Figure 5:
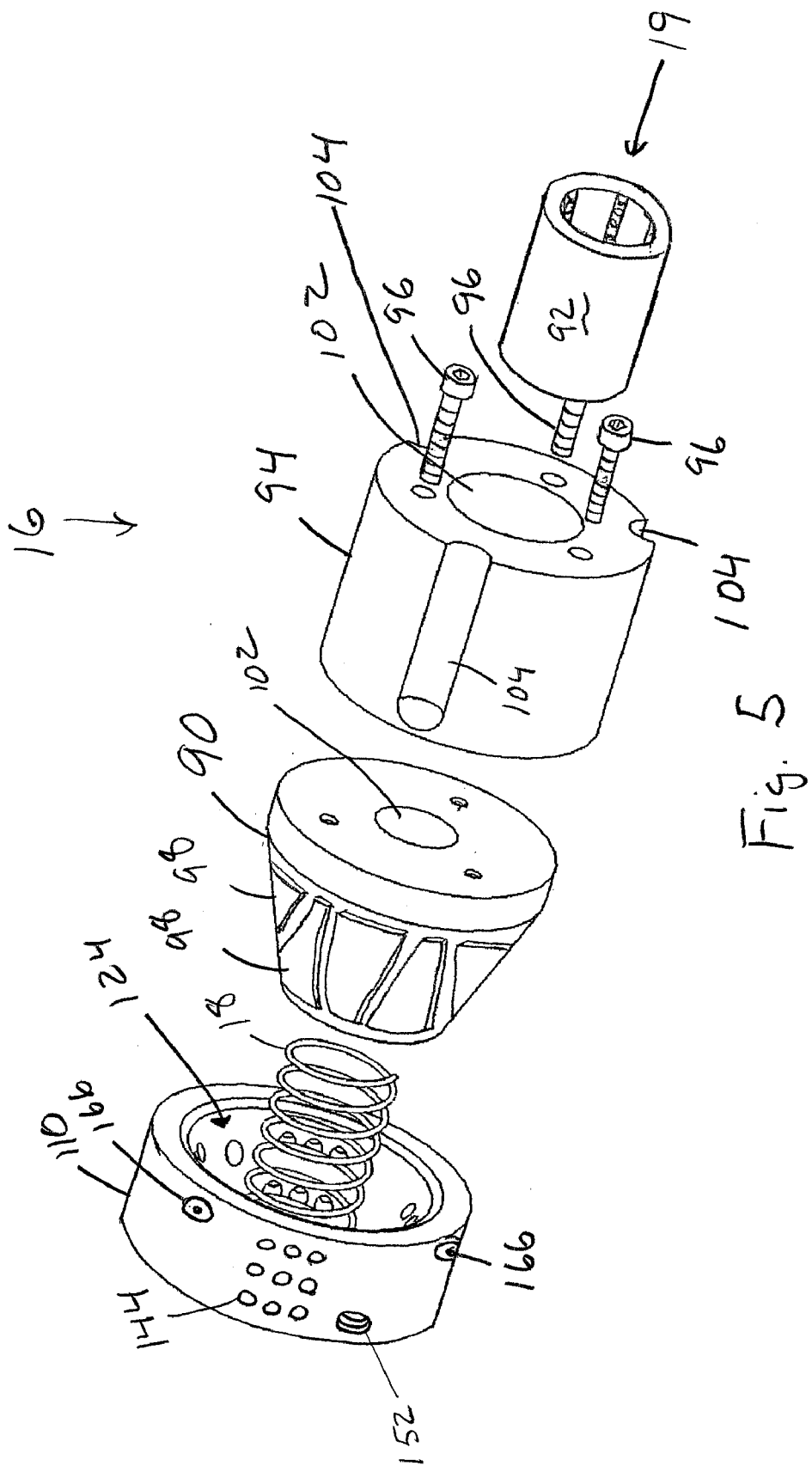
FIG. 5 is an exploded view of components of the hidden brake system according to the present invention.

The brake pad assembly 16 includes a brake head 90, brake pad assembly axle bearing 92 and a slide body 94, as shown in FIGS. 2–3 and 5. The brake pad assembly 16 is sized to fit through the open center 34 of the hub 26. FIGS. 2–3 show the brake head 90 and slide body 94 as one piece. FIG. 5 shows the brake head 90 and slide body 94 as two pieces connected together by bolts 96. The brake head 90 is cone shaped and includes brake pads 98. The brake head 90 includes a spring cavity 100 to receive one end of the spring 18. The slide body 94 and brake head 90 each include an open center 102 to act as part of the axle opening 19 to allow passage of an axle. The center opening 102 of the slide body 94 is large enough to receive the brake pad assembly axle bearing 92. The brake pad assembly axle bearing 92 is shown as high speed linear ball bearing. The slide body 94 includes guide grooves 104 for each brake pad assembly guide 56.

Figure 6:
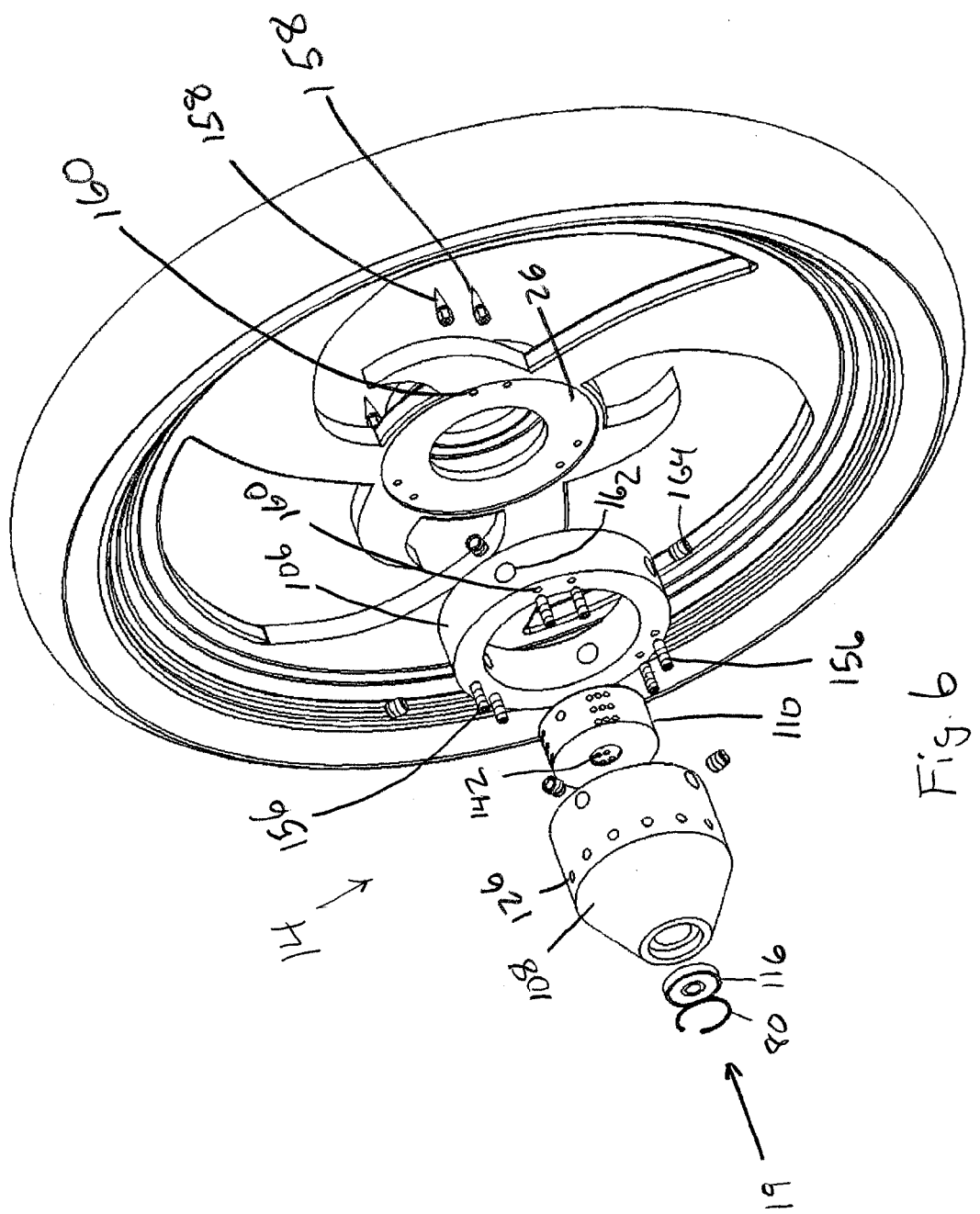
FIG. 6 is an exploded view of a drum assembly according to the present invention.
Figure 7:
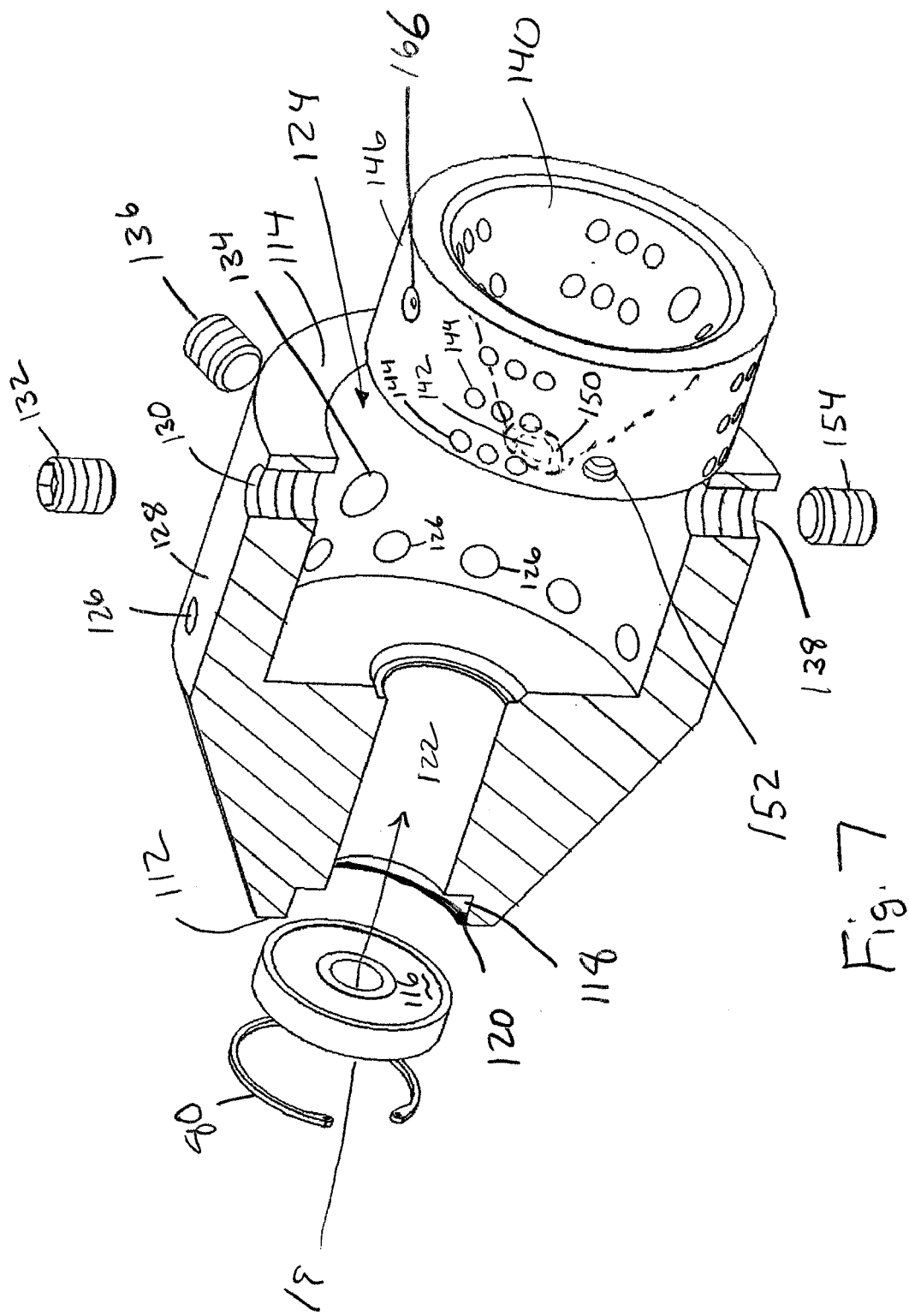
FIG. 7 is an exploded cross-sectional view of a drum assembly according to the present invention.

The drum assembly 14 is shown in exploded views in FIGS. 6–7. The drum assembly 14 includes an attachment collar 106, drum body 108 and drum wear unit 110. The drum body 108 includes an outside end 112 and an inside end 114. The drum body 108 includes a drum axle bearing 116 which fits into a drum axle bearing cavity 118 located on the outside end 112 of the drum body 108. The drum axle bearing 116 is shown as a standard sealed high speed bearing. The drum axle bearing cavity 118 includes a lip 120. The drum axle bearing 116 is retained in the same manner as the plunger housing axle bearing 58 using a snap ring 80 snapped into the drum axle bearing cavity 118 between the drum axle bearing 116 and the lip 80. The drum body 108 includes an axle passage 122 to act as part of the axle opening 19 to allow passage of an axle. The drum body 108 includes a drum wear unit cavity 124. The drum wear unit cavity 124 includes ventilation holes 126 from an outside surface 128 of the drum body 108 into the drum wear unit cavity 124. The drum body 108 includes threaded cavity set screw holes 130 from the outside surface 128 of the drum body 108 into the drum wear unit cavity 124 to receive set screws 132. The drum body 108 includes drum wear unit bolt holes 134 from the outside surface 128 of the drum body 108 into the drum wear unit cavity 124 to receive drum wear unit bolts 136. The drum body 108 includes threaded collar bolt holes 138 in the outside surface 128 of the drum body 108. The drum wear unit 110 is shown as a cylinder shape with a cone shaped brake surface cavity 140 within the drum wear unit 110. The drum wear unit 110 includes an axle passage 142 to act as part of the axle opening 19 to allow passage of an axle. The drum wear unit 110 includes ventilation holes 144 from an outside surface 146 of the drum wear unit 110 into the cone shaped brake surface cavity 140. The smaller end of the cone shape in the cone shaped brake surface cavity 140 is a circular spring area 150 large enough to receive the other end of the spring 18. The drum wear unit 110 includes threaded drum wear unit holes 152 to receive the drum wear unit bolts 154. The attachment collar 106 mounts to the side of the wheel 12 at the hub 26 using hub bolts 156 and nuts 158. The attachment collar 106 and the hub 26 of the wheel 12 both include hub bolt holes 160 to receive the hub bolts 156. The attachment collar 106 includes drum body bolt holes 162 to receive collar bolts 164 which thread into the collar bolt holes 138 of the drum body 108.

The hidden brake system is assembled and functions as follows. First, the drum assembly 14 is assembled and attached to the wheel 12. Whereby, the drum axle bearing 116 is mounted in the drum axle bearing cavity 118 using the snap ring 80. The drum wear unit 110 is inserted into the drum wear unit cavity 124. The drum wear unit 110 is secured in the drum wear unit cavity 124 by inserting the set screws 132 into the threaded cavity set screw holes 130 and tightening the set screws 132 against the drum wear unit 110. The drum wear unit 110 can include indentations 166 to receive the set screws 132, as shown in FIGS. 5 and 7. The drum wear unit 110 is further secured in the drum wear unit cavity 124 by inserting drum wear unit bolts 136 into the drum wear unit bolt holes 134 in the drum body 108 and tightening the drum wear unit bolts 136 into the threaded drum wear unit bolt holes 152 of the drum wear unit 110. The attachment collar 106 is mounted to the hub 26 using hub bolts 156 and nuts 158 with the hub bolt holes 160 of the attachment collar 106 and the hub 26. The drum body 108 is mounted to the attachment collar 106 by inserting the collar bolts 164 into the drum body bolt holes 162 of the attachment collar 106 and threading the collar bolts 164 into the collar bolt holes 138 of the drum body 108.

Next, the plunger assembly 10 is assembled and attached to the wheel 12. Whereby, the plunger housing axle bearing 58 is mounted in the plunger housing axle bearing cavity 78 using the snap ring 80. The plunger 38 is inserted into the brake pad assembly chamber 48 and over the post 62 of the hydraulic fluid chamber 46. The O-rings 68 are in place on both the post 62 and the plunger 38, when the plunger 38 is inserted. The O-rings 68 are used to seal off the hydraulic fluid chamber 46 from the brake pad assembly chamber 48 and the open center 64 of the post 62. The set screws 76 are threaded into the plunger removal holes 54 to seal the plunger removal holes 54. The plunger removal holes 54 are used to push the plunger 38 off the post 62 for removal, such as threading longer set screws into the hydraulic fluid chamber 46 to contact and push against the plunger 38. The hydraulic input connector 52 is threaded into the plunger housing 36, whereby the hydraulic input connector 52 is connected the brake input which is not shown. The brake pad assembly guides 56 are threaded into the plunger housing 36 such that the heads 86 extend into the brake pad assembly chamber 48. The brake pad assembly 16 is inserted into the brake pad assembly chamber 48 at the inside end 44 of the plunger housing 36, such that the heads 86 of the brake pad assembly guides 56 enter each of the guide grooves 104 of the slide body 94. The heads 86 of the brake pad assembly guides 56 and guide grooves 104 interact to prevent rotation of OLE_LINK1 the slide body OLE_LINK1 94, as the slide body 94 slides in the brake pad assembly chamber 48. The spring 18 is inserted into the spring cavity 100 of the brake head 90. The plunger assembly 10 is mounted to the hub 26 by inserting the spring 18 and brake head 90 first through the open center 34 of the hub 56. The recessed lip of inside end 44 of the plunger housing 36 is press fitted into the inner ring 32 of the hub bearing 28. The spring 18 is now located between the brake head 90 and the cone shaped brake surface cavity 140, such that one end is in the spring cavity 100 of the brake head 90 and the other end of the spring 18 is in the circular spring area 150 of the cone shaped brake surface cavity 140. An axle is positioned in the axle opening 19 of the hidden brake system for attachment to a motorcycle fork and the plunger housing 36 is secured to the motorcycle fork at the fork attachment hole 70. The axle and fork are not shown.

Once the hidden brake system is assembled, hydraulic fluid is added to the hydraulic fluid chamber 46 through the hydraulic fluid fill hole 50. The set screw 74 is used to seal the hydraulic fluid fill hole 50. The hidden brake system should be bled to purge any air in the system between the plunger housing 36 and the brake input before sealing the hydraulic fluid fill hole 50. The hidden brake system functions by activation of the brake input, which forces hydraulic fluid to flow from the brake input into the hydraulic fluid chamber 46 by way of the hydraulic input connector 52. The increase pressure on the plunger 38 due to the increase in hydraulic fluid flowing into the hydraulic fluid chamber 46 moves the plunger 38 against the slide body 94 of the brake pad assembly 16. The slide body 94 slides toward the hub 26 along the brake pad assembly guides 56, due to movement of the plunger 38. The slide body 94 pushes the brake head 90 into the cone shaped brake surface cavity 140 and overcomes the tension of the spring 18. When the slide body 94 pushes the brake assembly 16, the brake pads 98 of the brake head 90 are being pushed in against the cone shaped brake surface cavity 140. This causes contact between the brake pads 98 and the cone shaped brake surface cavity 140 and produces a braking action on the drum assembly 14 and hence the wheel 12. Once the brake input is released, the tension of the spring 18 overcomes the reduction in hydraulic pressure and forces the brake assembly 16 and plunger 38 back into their original positions in the plunger assembly 10 and releases the braking action. The drum wear unit 110 is a separate piece so that it can be replaced due to wear. The drum wear unit 110 is a cylinder with the cone shaped brake surface cavity 140 to provide more area to absorb heat as a result of the braking action, as a fully coned shaped wear unit would absorb less heat. This hidden brake system can be applied to other vehicles, including non-motorized vehicles such as bicycles.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A brake system for a wheel comprising:
   a plunger assembly adapted to mount to one side of the wheel, said plunger assembly including a plunger, a plunger housing and a brake pad assembly chamber in said plunger housing, said plunger movable in said plunger housing, said brake pad assembly chamber open towards the wheel, said plunger assembly including an axle opening adapted to receive an axle for the wheel;
   a brake pad assembly movably mounted in said brake pad assembly chamber, said brake system configured such that movement of said plunger causes movement of said brake pad assembly in said brake pad assembly chamber, said brake pad assembly including an axle opening adapted to receive the axle for the wheel;
   a spring which biases said brake pad assembly into said brake pad assembly chamber;
   a drum assembly adapted to mount to an other side of the wheel opposite said plunger assembly, said drum assembly including a drum housing and a drum wear unit in said drum housing, said drum wear unit open towards the wheel to receive said brake pad assembly, said drum assembly including an axle opening adapted to receive the an for the wheel.

2. The brake system of claim 1, wherein said plunger assembly, brake pad assembly, and drum assembly each include at least one bearing to support the axle for the wheel.

3. The brake system of claim 1, wherein said plunger assembly is mounted in a stationary position and said drum assembly rotates with the wheel.

4. The brake system of claim 1, wherein said plunger housing includes a hydraulic fluid chamber adapted to receive and store fluid to move said plunger and wherein said plunger is positioned in said housing to be moved by the fluid.

5. The brake system of claim 4, wherein said hydraulic fluid chamber includes a post to receive said plunger and wherein said plunger includes an opening to allow placement of said plunger over said post, such that said plunger slides along said post.

6. The brake system of claim 5, wherein at least one seal is used between said post and said plunger; wherein at least one seal is used between said plunger and said hydraulic fluid chamber; and wherein said seals allow movement of said plunger in said hydraulic fluid chamber along said post while retaining the fluid in said hydraulic fluid chamber.

7. The brake system of claim 4, wherein in said plunger housing includes at least one sealable opening in said hydraulic fluid chamber to allow for pushing said plunger out of said hydraulic fluid chamber.

8. The brake system of claim 1, wherein said plunger housing includes at least one brake pad assembly guide inside said brake pad assembly chamber to guide movement of said brake pad assembly.

9. The brake system of claim 8, wherein said brake pad assembly includes a guide groove for each of said at least one brake pad assembly guide to interact with said at least one brake pad assembly guide.

10. The brake system of claim 1, wherein said plunger housing includes a lip to be pressed into a bearing in the wheel.

11. The brake system of claim 1, wherein said brake pad assembly includes a brake head and at least one brake pad attached to said brake head.

12. The brake system of claim 11, wherein said brake head is removably attached to a slide body, said slide body being in contact with said plunger for movement of said brake pad assembly.

13. The brake system of claim 11, wherein said brake head is coned shaped where said at least one brake pad is attached.

14. The brake system of claim 11, wherein said brake head includes a spring cavity to receive said spring.

15. The brake system of claim 1, wherein said drum housing includes ventilation boles from an outside surface of said drum housing to said drum wear unit.

16. The brake system of claim 1, wherein said drum wear unit is removable.

17. The brake system of claim 1, wherein said drum wear unit includes a cone shaped brake surface cavity to receive said brake pad assembly.

18. The brake system of claim 1, wherein said drum housing includes a collar for attachment of said drum assembly to the wheel.

19. The brake system of claim 18, wherein said collar is removably attached to said drum housing.

20. The brake system of claim 1, wherein said drum wear unit includes ventilation holes from an outside surface of said drum wear unit to a brake surface cavity in said drum wear unit, said brake surface cavity configured to receive said brake pad assembly.

21. The brake system of claim 1, wherein said drum wear unit includes a spring area to receive said spring.

22. The brake system of claim 1, wherein said plunger housing includes at least two brake pad assembly guides inside said brake pad assembly chamber to guide movement of said brake pad assembly.

23. The brake system of claim 22, wherein said brake pad assembly includes a guide groove for each of said at least two brake pad assembly guides to interact with said at least two brake pad assembly guides.

* * * * *